US006883146B2

(12) United States Patent
Prabhu et al.

(10) Patent No.: US 6,883,146 B2
(45) Date of Patent: Apr. 19, 2005

(54) PICTURE DATABASE GRAPHICAL USER INTERFACE UTILIZING MAP-BASED METAPHORS FOR EFFICIENT BROWSING AND RETRIEVING OF PICTURES

(75) Inventors: Prasad V. Prabhu, Macedon, NY (US); Douglas B. Beaudet, Geneseo, NY (US); Elizabeth Rosenzweig, Newton, MA (US)

(73) Assignee: Eastman Kodak Company, Rochester, NY (US)

( * ) Notice: Subject to any disclaimer, the term of this patent is extended or adjusted under 35 U.S.C. 154(b) by 593 days.

(21) Appl. No.: 09/742,963

(22) Filed: Dec. 20, 2000

(65) Prior Publication Data

US 2002/0075329 A1 Jun. 20, 2002

(51) Int. Cl.[7] ............................................. G06K 15/00
(52) U.S. Cl. .................................... 715/854; 715/968
(58) Field of Search ................................ 715/854, 855, 715/853, 968, 802, 804, 805, 821, 817–820, 719–721, 779; 707/102; 345/855, 853–854, 711–713, 749, 838–839, 823; 701/201, 117; 324/261

(56) References Cited

U.S. PATENT DOCUMENTS

| | | | | | |
|---|---|---|---|---|---|
| 5,758,313 | A | * | 5/1998 | Shah et al. | 701/208 |
| 5,790,121 | A | * | 8/1998 | Sklar et al. | 715/853 |
| 5,922,040 | A | * | 7/1999 | Prabhakran | 701/117 |
| 5,945,985 | A | * | 8/1999 | Babin et al. | 345/302 |
| 6,028,603 | A | * | 2/2000 | Wang et al. | 715/776 |
| 6,088,648 | A | * | 7/2000 | Shah et al. | 701/117 |
| 6,097,389 | A | * | 8/2000 | Morris et al. | 715/804 |
| 6,144,968 | A | * | 11/2000 | Zellweger | 707/104.1 |
| 6,202,061 | B1 | * | 3/2001 | Khosla et al. | 707/3 |
| 6,307,573 | B1 | * | 10/2001 | Barros | 345/764 |
| 6,327,533 | B1 | * | 12/2001 | Chou | 701/207 |
| 6,346,938 | B1 | * | 2/2002 | Chan et al. | 345/419 |
| 6,353,794 | B1 | * | 3/2002 | Davis et al. | 701/201 |
| 6,608,650 | B1 | * | 8/2003 | Torres et al. | 348/373.02 |
| 6,611,142 | B1 | * | 8/2003 | Jones et al. | 324/261 |
| 6,657,702 | B1 | * | 12/2003 | Chui et al. | 355/40 |

* cited by examiner

*Primary Examiner*—Steven P Sax
(74) *Attorney, Agent, or Firm*—Ronald R. Schindler, II

(57) ABSTRACT

In contrast to prior art picture database browsing and retrieving methods which require the tedious opening and perusing of directories, folders and files, the present-inventive graphical user interface system (500) and method produces several display levels (100,200,300,400) of user-friendly geographical/map metaphors from picture metadata with picture icons (116, 216, 316) representing pictures captured at locations on maps. The characteristics of the display levels (100, 200, 300, 400) are programmable by the user. In the preferred embodiment, the size of the picture icons (116, 216, 316) is proportional to the number of pictures captured at the icon location. Further features of the present-inventive graphical user interface (GUI) include a "tool tip" which appears indicating the number of pictures represented by a picture icon (116, 216, 316), when the screen cursor is placed over the picture icon (116, 216, 316). In an example according to the present-inventive GUI, the first display level (100) includes a world map metaphor (114) with picture icons (116) located at the global capture locations of the pictures in the picture database. Each additional display level (200, 300, 400) provides greater geographic specificity of the picture capture locations. Such additional display levels include continent or country of capture (200), state or territory of capture (300), and city or town of capture (400), etc., with the last display level including thumbnail representations (430–448) of the pictures captured at the specified capture locations.

26 Claims, 5 Drawing Sheets

PICTURE DATABASE GRAPHICAL USER INTERFACE UTILIZING MAP-BASED METAPHORS FOR EFFICIENT BROWSING AND RETRIEVING OF PICTURES

FIELD OF THE INVENTION

The present invention relates to graphical user interfaces in general, and in particular, to graphical user interfaces adapted to navigate pictures in a digital picture database.

BACKGROUND OF THE INVENTION

Digital images have become commonplace in interactive media such as web pages on the World Wide Web. In many systems the image is captured by a digital camera and stored as an image file, which an online user can later view. Digital images can also be captured by a digital camera and stored in a digital picture database using the memory mechanisms (e.g., hard drive, CD RW, diskette, etc.) of a personal computer (PC). Whether the user's computer operates in a stand-alone mode, or as a remote terminal, he/she can retrieve database pictures for viewing and printing by an attached printer.

The number of digital pictures, and hence the size of digital picture databases continues to grow, as the costs of digital cameras and memory continue to drop. It is becoming more common for a user to have stored in a digital picture database, many more pictures (even using "thumbnails") than can be displayed on one or a few display screens. Finding particular pictures of interest in a large picture database can be challenging using methods typically available, for example, in the Windows® and Macintosh® operating systems. Users must typically open directories, and several folders and files, often painstakingly perusing each of a large number of digital images in an effort to find those of interest. Further, there is often no efficient way to retrieve groups of pictures not stored in the same files or folders, which the user may nonetheless, desire to retrieve and display in the same group.

What is therefore sorely lacking in the prior art, is a graphical user interface which users can use to navigate and retrieve picture database images, in an efficient, logical and user-friendly manner.

SUMMARY OF THE INVENTION

In view of the aforementioned problems and deficiencies of the prior art, the present invention provides a method for browsing and retrieving pictures in a picture database. The method at least includes the steps of capturing a digital image, receiving position information in the form of metadata corresponding to a geographical location where the digital image is captured, and storing digital images and associated metadata in the picture database.

The method also at least includes the steps of generating a main display level having a first geographical metaphor with picture icons, each the picture icon corresponding to a group of pictures in the picture database captured at a specific location in the first geographical metaphor, and generating at least a second display level linked to the main display level, the second display level having a second geographical metaphor with greater geographical specificity than the first geographical metaphor with picture icons, each picture icon corresponding to a group of pictures in the picture database captured at a specific location in the second geographical metaphor.

The present invention also provides a GUI system adapted for browsing and retrieving pictures in a picture database. The system at least includes memory adapted to store digital images and associated metadata corresponding to capture location in the picture database, a main display level generator adapted to generate a main display level having a first geographical metaphor with picture icons, each picture icon corresponding to a group of pictures in the picture database captured at a specific location in the first geographical metaphor. The system also at least includes a second display generator adapted to generate a second display level linked to the main display level, the second display level having a second geographical metaphor with greater geographical specificity than the first geographical metaphor with picture icons, each picture icon corresponding to a group of pictures in the picture database captured at a specific location in the second geographical metaphor.

BRIEF DESCRIPTION OF THE DRAWINGS

Features and advantages of the present invention will become apparent to those skilled in the art from the description below, with reference to the following drawing figures, in which.

DETAILED DESCRIPTION OF THE INVENTION

Along with the data representing the actual images, files stored in the picture database can also contain "metadata." Metadata is information about other information in a file or, information about data stored in a file. For purposes of digital picture databases, metadata can represent characterizations of the pictures, such as the place a picture was captured, the date and/or time of capture, and the date and time of capture, among others.

Metadata can be entered manually by a user having access to the picture database, or it can be entered automatically by the camera when a picture is captured. For example, automatic location systems can be combined with cameras to automate the capture location information gathering process. Such automatic location systems include the Global Positioning Satellite (GPS) and Radio Triangulation (RT). An automatic location receiver can be either incorporated in the hardware of the digital camera, or located nearby. Using these approaches, image files contain not only raw image data, but also a date and time stamp, along with header information related to the location of the automatic location receiver when the image is collected.

As will be described below in more detail, the present-inventive graphical user interface (GUI) novelly extracts geographic metadata from the picture database files to generate a series of linked display levels containing geographical metaphors—each succeeding display level having greater geographical specificity than the previous display level. That is, geographical map metaphors are produced having picture icons located at each geographic location where pictures in the picture database were captured. Activating a picture icon in a current display level generates a new display level. When the screen cursor is placed over a picture icon, a "tool tip" indicates the number of pictures represented by the icon.

The user can configure the GUI to choose the number of geographic metaphors, along with the geographic specificity of each, and which geographic metaphor will be included in the main display level. The user can also configure the display levels to cover desired time periods, such as a particular year, or range of years represented by the pictures of interest. In the preferred embodiment, the display level succeeding the last display level with a geographical metaphor includes thumbnails of the pictures represented by the activated icon in the previous display level. The thumbnails can be activated to produce the full pictures in a manner known in the art.

Figure 1:
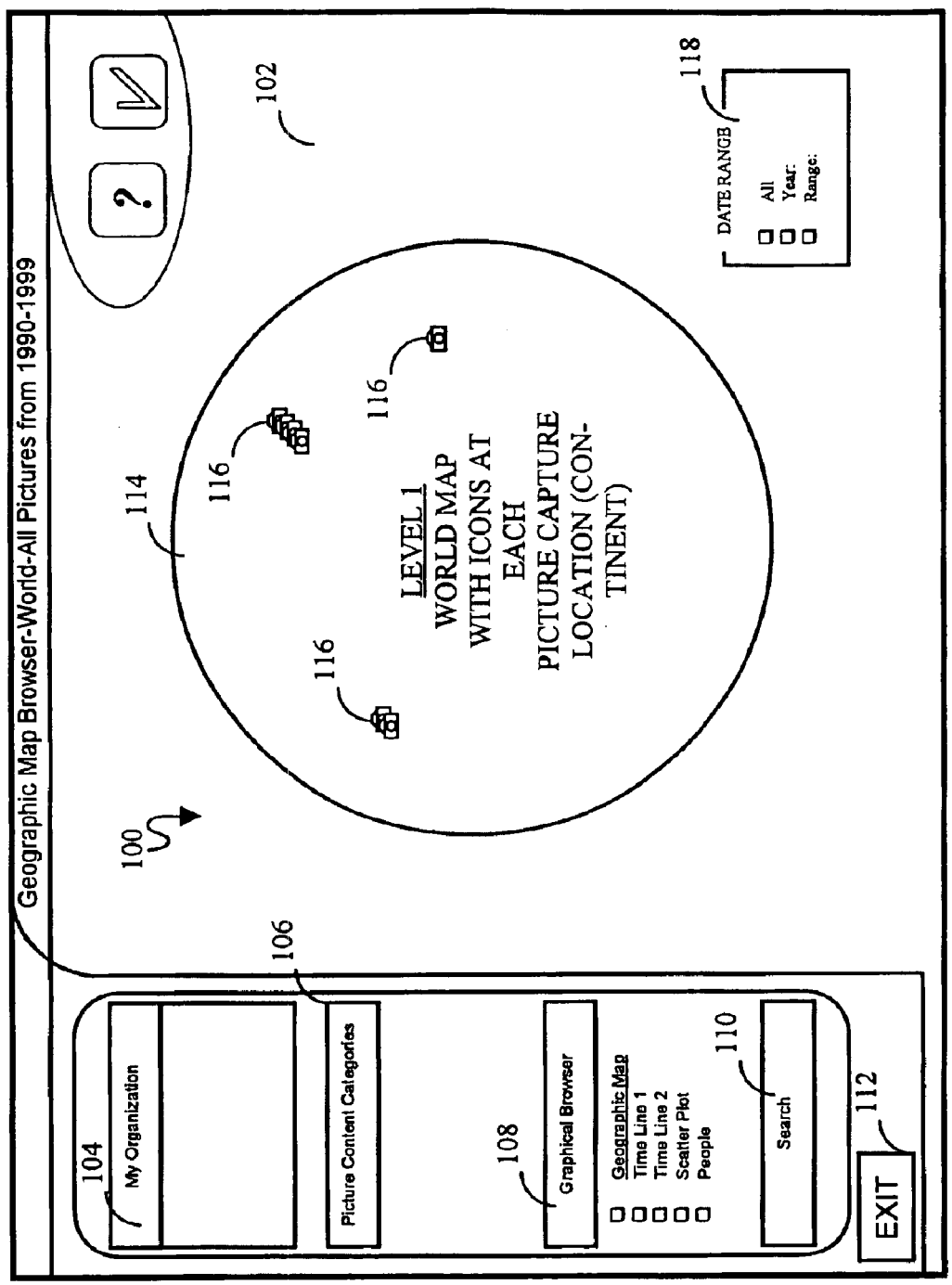
FIG. 1 is an illustration of the main display level of the preferred embodiment of the present-inventive graphical user interface (GUI) having a world map metaphor.
Figure 2:
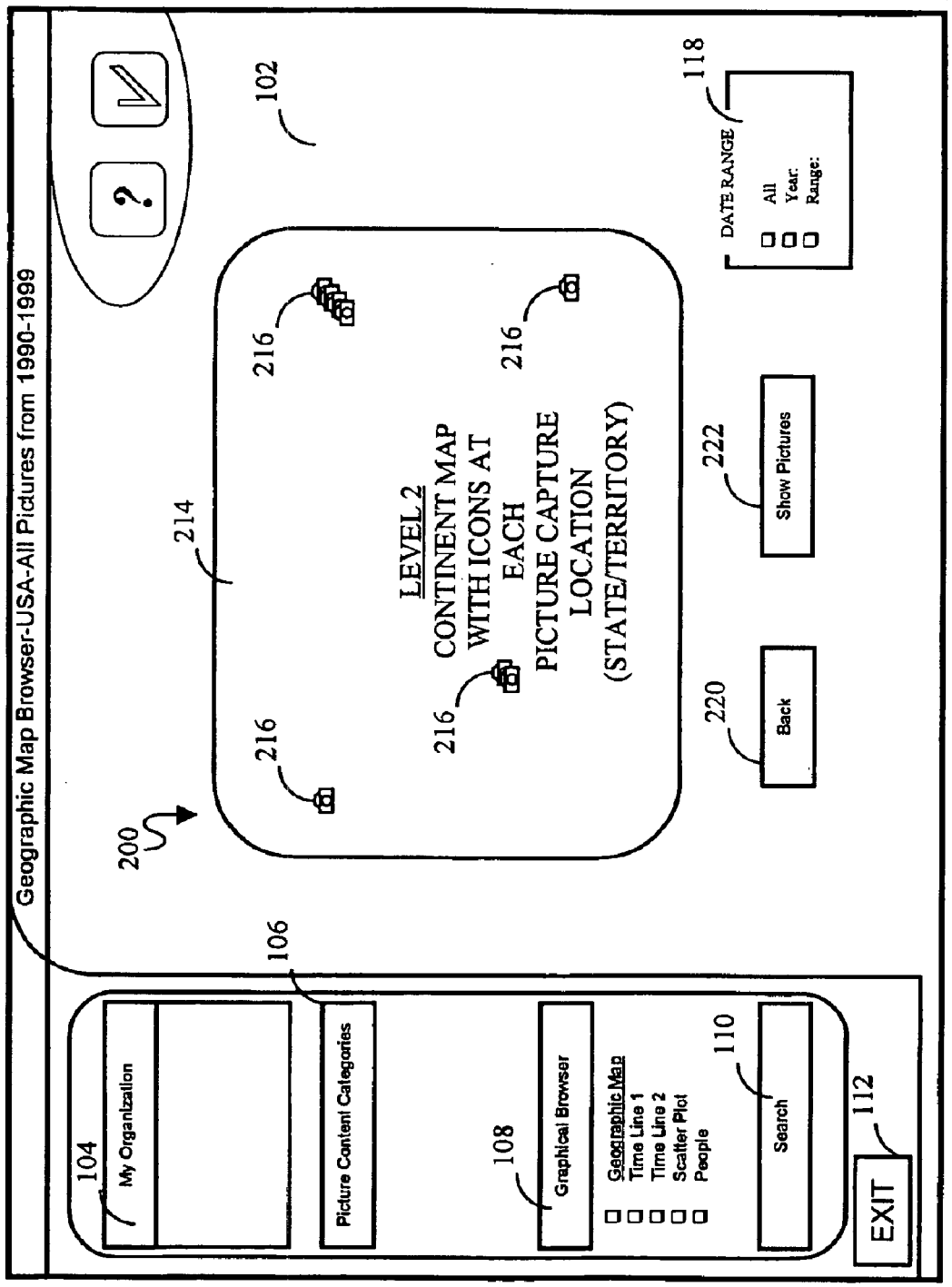
FIG. 2 is an illustration of the second display level of the preferred embodiment of the present-inventive GUI having a continent/country map metaphor.

FIG. 1 illustrates the first ("main") display level 100 of the preferred embodiment of the browser incorporated by the present-inventive GUI. The main display level, as with all display levels, includes a display area 102. The display levels of the preferred embodiment also include regions 104, 106 and 110, which relate to methods of navigating the picture database that are not specifically part of the present invention. The region 108, however, allows a user to choose the type of graphical browser to navigate the picture database, including the present-inventive geographic map metaphor browser. There is also an "exit" button 112 for exiting the GUI, and a "date range" box 118, which allows the user to determine the time period of the pictures to be browsed.

The main display level 100 includes the broadest geographical metaphor 114. In the preferred embodiment, the geographical metaphor is a world map, although the user can elect another type of map to use with greater geographic specificity, if desired. The world map metaphor 114 includes picture icons 116 at each global location where database pictures have been captured. To show the relative number of pictures captured at each location (in the preferred embodiments), the picture icons 116 can either be shown in different sizes, or in small groups, with the number of icons in a group corresponding to the number of pictures captured at a location. The picture icons may have any suitable shape as a matter of design choice.

The present invention can accommodate almost any sort of map to display as the geographic metaphor, including, inter alia: Interrupted Goode Homolosine projections; Mercator projections; Gall's stereographic projections; Sinusoidal (Sanson-Flamsteed) projections; Mollweide projections; Hammer (Hammer-Aitoff) projections; Bartholomew's Nordic, Regional and 'The Times' projections; Orthographic projections; Equidistant projections; Lambert azimuthal equal-area projections; polar projections; Conic projections; and Bonne projections.

The world map metaphor 114 may show, for example, the continents where pictures were captured. By clicking on one of the picture icons 116, a user can cause a new display level 200 to be generated with a greater degree of geographic specificity. In the example, the second display level 200 contains a continent or country map of the United States. The object 214 symbolically represents the United States for illustrative purposes of this Letters Patent. By activating the buttons 222 or 220, the user can show the pictures grouped in the second display level, or return to the previous display level, respectively.

Figure 3:
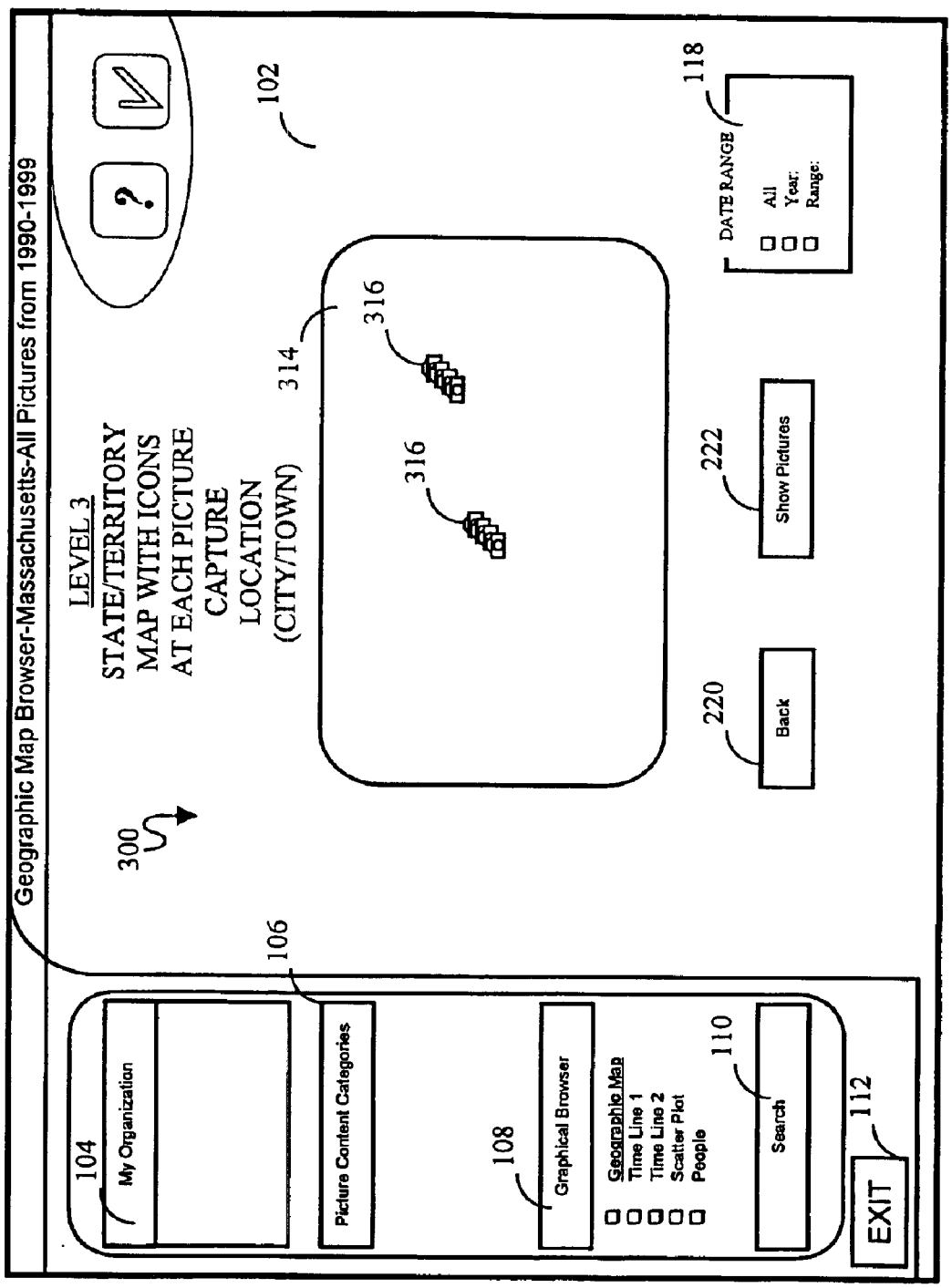
FIG. 3 is an illustration of the third display level of the preferred embodiment of the present-inventive GUI having a state/territory map metaphor.
Figure 4:
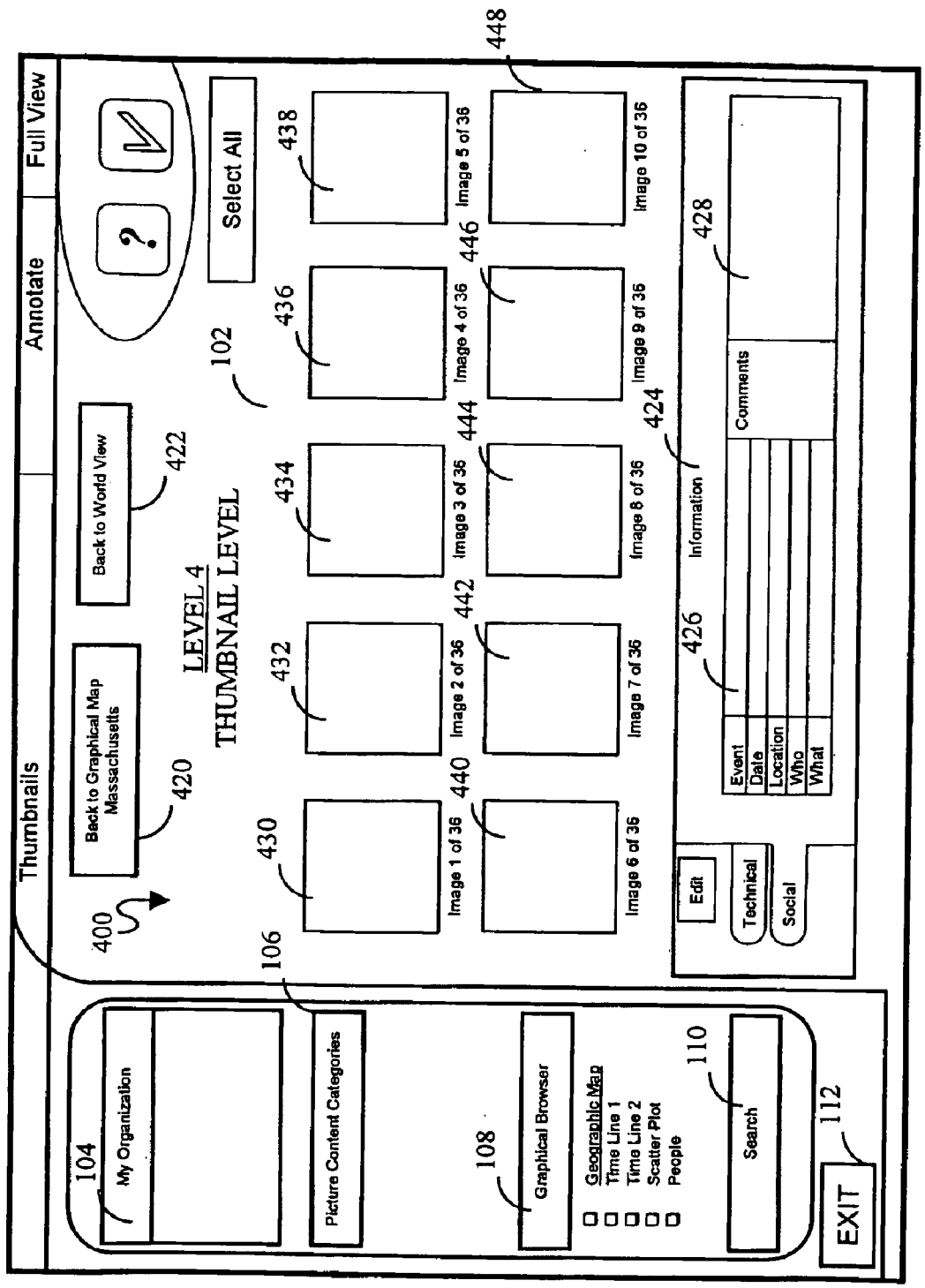
FIG. 4 is an illustration of the fourth display level of the preferred embodiment of the present-inventive GUI having a city/town map metaphor.

To cause a new (third) display level 300 to be generated having greater geographic specificity, the user activates a picture icon 216 in the state of interest. In the example, the user is interested in pictures that were captured in the State of Massachusetts. Therefore, the object 314 in FIG. 3 symbolically represents the State of Massachusetts. Should the user wish to display the pictures captured in Massachusetts according to the date range in the box 118, he/she can activate the button 222. If not, the user can choose to cause a new geographic metaphor to be generated with greater geographic specificity. In the example, the user has found a group of pictures of interest that were captured at a particular city or town in Massachusetts. Therefore, by activating a picture icon 316, a fourth display level 400 in FIG. 4 is generated with thumbnails (430–448) of pictures captured at the city or town of interest during the dates and/or times of interest. As is typical, activating a thumbnail produces a full-size picture. The user can return to the main display level 100 by activating a button 422, or to the previous display level by activating the button 420.

In the display level 400 with the thumbnails, an information box 424 provides information derived from the picture metadata, such as events, dates, locations, people featured in the pictures, etc. (area 426), and any comments (area 428).

Figure 5:
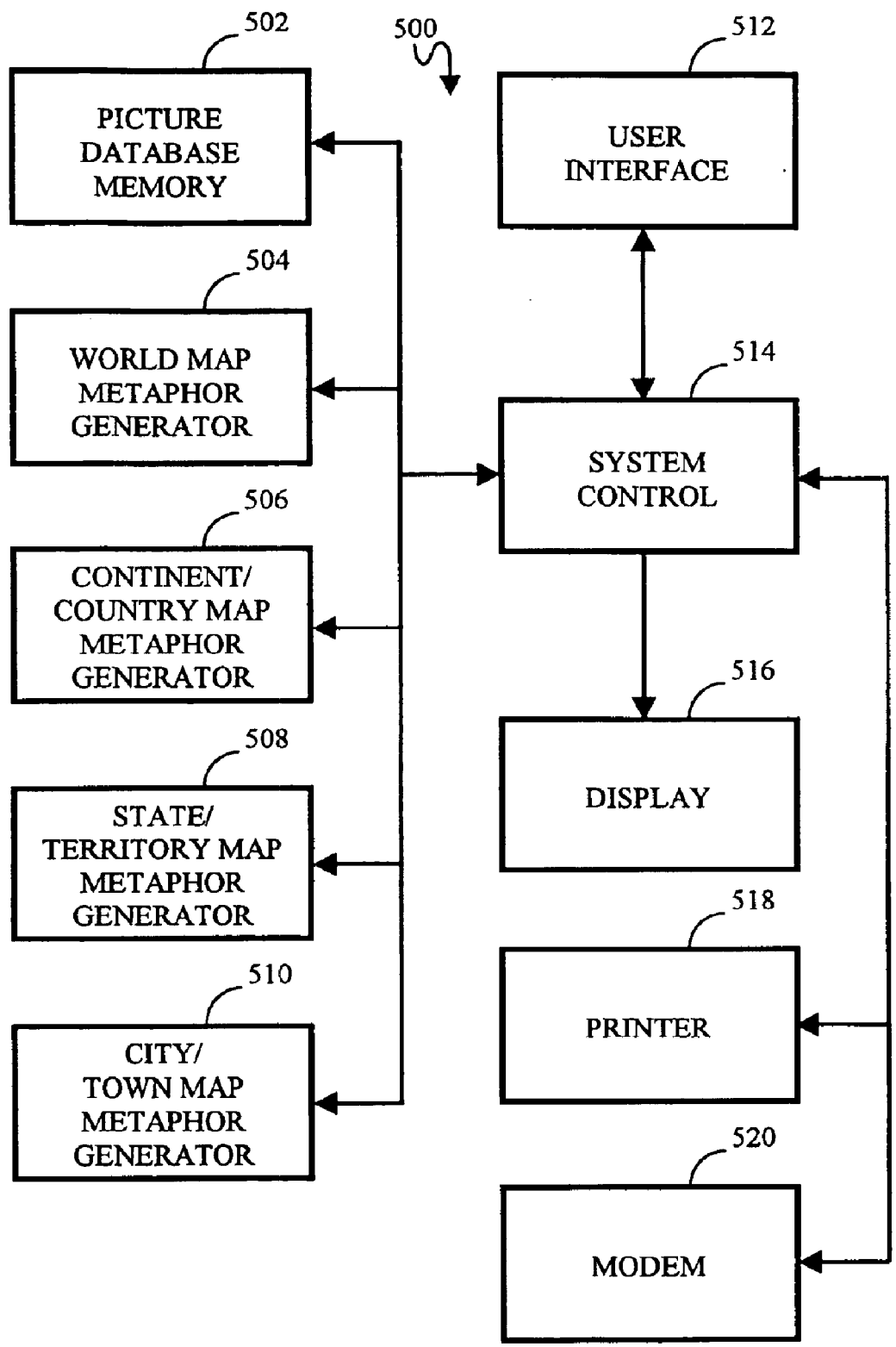
FIG. 5 is a general schematic block diagram of a system suitable for producing the present-inventive GUI.

A general schematic block diagram 500 for implementing the present-inventive GUI is shown in FIG. 5. It will be appreciated by those skilled in the art that many features identified with separate blocks can be implemented with software. The system 500 includes a picture database memory 502 which may be any suitable memory medium for storing the database pictures, including shared resources. A system control 514, to which a user can communicate via a user interface 512, controls the overall system operation. For example, in response to a user command from user interface 512, the system control 514 causes map metaphor generators 504–510 to generate the map metaphors, and hence the display levels associated with the present-inventive GUI, for display or reproduction on display 516 or printer 518. The system 500 also nominally includes a modem 520 for communication of a user-terminal with host processors and host databases, when the user's computer operates as a remote terminal.

Variations and modifications of the present invention are possible, given the above description. However, all variations and modifications which are obvious to those skilled in the art to which the present invention pertains are considered to be within the scope of the protection granted by this Letters Patent.

Parts List

100 Main graphical user interface (GUI) display level
102 Display area
104 Hierarchical picture grouping iconic region
106 Picture content iconic region
108 Graphical browser region
110 Word search region
112 GUI exit button
114 World map metaphor with picture capture locations
116 Picture icons
118 Date range box
200 Second GUI display level
214 Continent/country map metaphor with picture capture locations 216 Picture icons
220 Previous display level activation button
222 "Show picture" button
300 Third GUI display level
314 State/territory map metaphor with picture capture locations
316 Picture icons
400 Fourth GUI display level
420 "Back to state/territory map display level" button
422 "Back to world map display level" button
424 Information box/area
426 Picture information area
428 Picture information area
430–448 "Thumbnails"
500 GUI system block diagram
502 Picture database memory
504 World map metaphor generator
506 Continent/country map metaphor generator
508 State/territory map metaphor generator
510 City/town map metaphor generator
512 User interface
514 System control
516 Display
518 Printer
520 Modem

What is claimed is:

1. A method for browsing and retrieving pictures in a picture database via a graphical user interface (GUI), said method comprising the steps of:

capturing a digital image;

receiving position information in the form of metadata corresponding to a geographical location where said digital image is captured;

storing digital images and associated metadata in said picture database;

generating a main display level having a first geographical metaphor with picture icons, each said picture icon indicating a specific location in said first geographical metaphor at which a group of pictures in said picture database was captured, and each said picture icon positioned within the environment of the first geographical metaphor at a location that corresponds to the specific location at which the group of pictures was captured;

generating at least a second display level linked to said main display level, said second display level having a second geographical metaphor with greater geographical specificity than said first geographical metaphor with picture icons, each said picture icon indicating a specific location in said second geographical metaphor at which a group of pictures in said picture database was captured, and each said picture icon positioned within the environment of the second geographical metaphor at a location that corresponds to the specific location at which the group of pictures was captured; and generating an additional display level comprising digital representations of the pictures corresponding to icons in said second display level, wherein said second display level is generated via activating a picture icon in said main display level, and wherein the additional display level is generated by activating a picture icon in the second display level a picture icon in said main display level.

2. The method in claim 1, wherein the relative size of said picture icons is proportional to the number of pictures captured at the locations on the geographical metaphor where said picture icons are placed.

3. The method in claim 1, wherein the geographic specificity of each display level is configurable by a user.

4. The method in claim 1, wherein said metadata further comprises temporal capture information.

5. The method in claim 4, wherein the temporal specificity of each display level is configurable by a user.

6. A method for browsing and retrieving pictures in a picture database via a graphical user interface (GUI), said method comprising the steps of:

capturing a digital image;

receiving position information in the form of metadata corresponding to a geographical location where said digital image is captured;

storing digital images and associated metadata in said picture database;

generating a main display level having a first geographical metaphor with picture icons, each said picture icon indicating a specific location in said first geographical metaphor at which a group of pictures in said picture database was captured, and each said picture icon positioned within the environment of the first geographical metaphor at a location that corresponds to the specific location at which the group of pictures was captured;

generating at least a second display level linked to said main display level, said second display level having a second geographical metaphor with greater geographical specificity than said first geographical metaphor with picture icons, each said picture icon indicating a specific location in said second geographical metaphor at which a group of pictures in said picture database was captured, and each said picture icon positioned within the environment of the second geographical metaphor at a location that corresponds to the specific location at which the group of pictures was captured; and generating a third display level linked to said second display level, said third display level having a third geographical metaphor with greater geographical specificity than said second geographical metaphor with picture icons, each said picture icon indicating a specific location in said second geographical metaphor at which a group of pictures in said picture database was captured, and each said picture icon positioned within the environment of the third geographical metaphor at a location that corresponds to the specific location at which the group of pictures was captured; and generating an additional display level comprising digital representations of the pictures corresponding to icons in said third display level, wherein said third display level is generated via activating a picture icon in said main display level, said third display level is generated via activating a picture icon in said second display level, and wherein the additional display level is generated by activating a picture icon in third display level.

7. A method for browsing and retrieving pictures in a picture database via a graphical user interface (GUI), said method comprising the steps of:

capturing a digital image;

receiving position information in the form of metadata corresponding to a geographical location where said digital image is captured;

storing digital images and associated metadata in said picture database;

generating a main display level having a first geographical metaphor with picture icons, each said picture icon indicating a specific location in said first geographical metaphor at which a group of pictures in said picture database was captured; and each said picture icon positioned within the environment of the first geographical metaphor at a location that corresponds to the specific location at which the group of pictures was captured;

generating at least a second display level linked to said main display level, said second display level having a second geographical metaphor with greater geographical specificity than said first geographical metaphor with picture icons, each said picture icon indicating a specific location in said second geographical metaphor at which a group of pictures in said picture database was captured, and each said picture icon positioned within the environment of the second geographical metaphor at a location that corresponds to the specific location at which the group of pictures was captured;

generating a third display level linked to said second display level, said third display level having a third geographical metaphor with greater geographical specificity than said second geographical metaphor with picture icons, each said picture icon indicating a specific location in said third geographical metaphor at which a group of pictures in said picture database was captured, and each said picture icon positioned within the environment of the third geographical metaphor at a location that corresponds to the specific location at which the group of pictures was captured;

generating a fourth display level linked to said third display level, said fourth display level having a fourth geographical metaphor with greater geographical specificity than said third geographical metaphor with picture icons, each said picture icon indicating a specific location in said second geographical metaphor at which a group of pictures in said picture database was captured, and each said picture icon positioned within the environment of the fourth geographical metaphor at a location that corresponds to the specific location at which the group of pictures was captured; and generating an additional display level comprising digital representations of the pictures corresponding to icons in said third display level, wherein said second display level is generated via activating a picture icon in said main display level, said third display level is generated via activating a picture icon in said second display level, said fourth display level is generated via activating a picture icon in said third display level, and wherein the additional display level is generated by activating a picture icon in the fourth display level.

8. A method for browsing and retrieving pictures in a picture database via a graphical user interface (GUI), said method comprising the steps of:

generating a main display level having a first geographical metaphor with picture icons, each said picture icon indicating a specific location in said first geographical metaphor at which a group of pictures in said picture database was captured; and each picture icon positioned within the environment of the first geographical metaphor at a location that corresponds to the specific location at which the group of pictures was captured;

a second display generator adapted to generate a second display level linked to said main display level, said second display level having a second geographical metaphor with greater geographical specificity than said first geographical metaphor with picture icons, each said picture icon indicating a specific location in said first geographical metaphor at which a group of pictures in said picture database was captured, and each picture icon positioned within the environment of the second geographical metaphor at a location that corresponds to the specific location at which the group of pictures was captured;

a third display level generator adapted to generate a third display level linked to said second display level, said third display level having a third geographical metaphor with greater geographical specificity than said second geographical metaphor with picture icons, each said picture icon indicating a specific location in said third geographical metaphor at which a group of pictures in said picture database was captured, and each picture icon positioned within the environment of the third geographical metaphor at a location that corresponds to the specific location at which the group of pictures was captured;

a fourth display generator adapted to generate a fourth display level linked to said third display level, said fourth display level having a fourth geographical metaphor with greater geographical specificity than said third display level having a fourth geographical metaphor with greater geographical specificity than said second geographical metaphor with picture icons, each said picture icon indicating a specific location in said fourth geographical metaphor at which a group of pictures in said picture database was captured, and each said picture icon positioned within the environment of the third geographical metaphor at a location that corresponds to the specific location at which the group of pictures was captured;

a fifth display generator adapted to generate a fifth display level linked to said fourth display level, said fifth display level having a fifth geographical metaphor with greater geographical specificity than said fourth geographical metaphor with picture icons, each said picture icon indicating a specific location in said fifth geographical metaphor at which a group of pictures in said picture database was captured, and each picture icon positioned within the environment of the fourth geograophical metaphor at a location that corresponds to the specific location at which the group of pictures was captured; and an additional level generator adapted to generate an additional display level comprising digital representations of the pictures corresponding to icons in said fifth display level;

wherein said second display level is generated via activating a picture icon in said main display level, said third display level is generated via activating a picture icon in said second display level, said fourth display level is generated via activating a picture icon in said third display level, said fifth display level is generated via activating a picture icon in said fourth display level, and wherein the additional display level is generated by activating a picture icon in the fifth display level.

9. The method in claim 1, wherein said first geographical metaphor is a world map.

10. The method in claim 1, wherein said first geographical metaphor is a world map, and said second geographical metaphor is a continent map.

11. The method in claim 1, wherein said first geographical metaphor is a world map, and said second geographical metaphor is a country map.

12. The method in claim 6, wherein said first geographical metaphor is a world map, said second geographical metaphor is a continent/country map, and said third geographical metaphor is a state/territory map.

13. The method in claim 7, wherein said first geographical metaphor is a world map, said second geographical metaphor is a continent/country map, said third geographical metaphor is a state/territory map, and said fourth geographical metaphor is a city/town map.

14. A graphical user interface (GUI) system adapted for browsing and retrieving pictures in a picture database, said system comprising:
  a memory adapted to store digital images and associated metadata corresponding to capture location in said picture database;
  a main display level generator adapted to generate a main display level having a first geographical metaphor with picture icons, each said picture icon indicating a specific location in said first geographical metaphor at which a group of pictures in said picture database was captured; and each picture icon positioned within the environment of the first geographical metaphor at a location that corresponds to the specific location at which the group of pictures was captured;
  a second display generator adapted to generate a second display level linked to said main display level, said second display level having a second geographical metaphor with greater geographical specificity than said first geographical metaphor with picture icons, each said picture icon indicating a specific location in said first geographical metaphor at which a group of pictures in said picture database was captured; and each picture icon positioned within the environment of the second geographical metaphor at a location that corresponds to the specific location at which the group of pictures was captured; and
  an additional display level generator adapted to an additional display level comprising digital representations of the pictures corresponding to icons in said second display level;
  wherein said second display generator is triggered via activating a picture icon in said main display level, and wherein the additional display level is generated by activating a picture icon in the second display level.

15. The system in claim 14, wherein the relative size of said picture icons is proportional to the number of pictures captured at the locations on the geographical metaphor where said picture icons are placed.

16. The system in claim 14, wherein the geographic specificity of each display level is configurable by a user.

17. The system claim 14, wherein said metadata further comprises temporal capture information.

18. The system in claim 17, wherein the temporal specificity of each display level is configurable by a user.

19. A graphical user interface (GUI) system adapted for browsing and retrieving pictures in a picture database, said system comprising:
  a memory adapted to store digital images and associated metadata corresponding to capture location in said picture database;
  a main display level generator adapted to generate a main display level having a first geographical metaphor with picture icons, each said picture icon indicating a specific location in said first geographical metaphor at which a group of pictures in said picture database was captured; and each picture icon positioned within the environment of the first geographical metaphor at a location that corresponds to the specific location at which the group of pictures was captured;
  a second display level generator adapted to generate a second display level linked to said main display level, said second display level having a second geographical metaphor with greater geographical specificity than said first geographical metaphor with picture icons, each said picture icon indicating a specific location in said first geographical metaphor at which a group of pictures in said picture database was captured; and each picture icon positioned within the environment of the second geographical metaphor at a location that corresponds to the specific location at which the group of pictures was captured;
  a third display level generator adapted to generate a third display level linked to said second display level, said third display level having a third geographical metaphor with greater geographical specificity than said second geographical metaphor with picture icons, each said picture icon indicating a specific location in said third geographical metaphor at which a group of pictures in said picture database was captured, and each picture icon positioned within the environment of the third geographical metaphor at a location that corresponds to the specific location at which the group of pictures was captured; and
  an additional display level generator adapted to an additional display level comprising digital representations of the pictures corresponding to icons in said third display level;
  wherein said second display level is generated via activating a picture icon in said main display level, said third display level is generated via activating a picture icon in said second display level, and wherein the additional display level is generated by activating a picture icon in the third display level.

20. A graphical user interface (GUI) system adapted for browsing and retrieving pictures in a picture database, said system comprising:
  a memory adapted to store digital images and associated metadata corresponding to capture location in said picture database;
  a main display level generator adapted to generate a main display level having a first geographical metaphor with picture icons, each said picture icon indicating a specific location in said first geographical metaphor at which a group of pictures in said picture database was captured; and each picture icon positioned within the environment of the first geographical metaphor at a location that corresponds to the specific location at which the group of pictures was captured;
  a second display generator adapted to generate a second display level linked to said main display level, said second display level having a second geographical metaphor with greater geographical specificity than said first geographical metaphor with picture icons, each said picture icon indicating a specific location in said first geographical metaphor at which a group of pictures in said picture database was captured; and each picture icon positioned within the environment of the second geographical metaphor at a location that corresponds to the specific location at which the group of pictures was captured;

a third display level generator adapted to generate a third display level linked to said second display level, said third display level having a third geographical metaphor with greater geographical specificity than said second geographical metaphor with picture icons, each said picture icon indicating a specific location in said third geographical metaphor at which a group of pictures in said picture database was captured, and each picture icon positioned within the environment of the third geographical metaphor at a location that corresponds to the specific location at which the group of pictures was captured;

a fourth display generator adapted to generate a fourth display level linked to said third display level, said fourth display level having a fourth geographical metaphor with greater geographical specificity than said third geographical metaphor with picture icons, each said picture icon indicating a specific location in said third geographical metaphor at which a group of pictures in said picture database was captured and each picture icon positioned within the environment of the third geographical metaphor at a location that corresponds to the specific location at which the group of pictures was captured; and an additional level generator adapted to generate an additional level comprising digital representations of the pictures corresponding to icons in said fourth display level;

wherein said second display level is generated via activating a picture icon in said main display level, said third display level is generated via activating a picture icon in said second display level, said fourth display level is generated via activating a picture icon in said third display level, and wherein the additional display level is generated by activating a picture icon in the fourth display level.

21. A graphical user interface (GUI) system adapted for browsing and retrieving pictures in a picture database, said system comprising:

a memory adapted to store digital images and associated metadata corresponding to capture location in said picture database:

a main display level generator adapted to generate a main display level having a first geographical metaphor with picture icons, each said picture icon indicating a specific location in said first geographical metaphor at which a group of pictures in said picture database was captured; and each picture icon positioned within the environment of the first geographical metaphor at a location that corresponds to the specific location at which the group of pictures was captured;

a second display generator adapted to generate a second display level linked to said main display level, said second display level having a second geographical metaphor with greater geographical specificity than said first geographical metaphor with picture icons, each said picture icon indicating a specific location in said first geographical metaphor at which a group of pictures in said picture database was captured; and each picture icon positioned within the environment of the second geographical metaphor at a location that corresponds to the specific location at which the group of pictures was captured;

a third display level generator adapted to generated a third display level linked to said second display level, said third display level having a third geographical metaphor with greater geographical specificity than said second geographical metaphor with picture icons, each said picture icon indicating a specific location in said third geographical metaphor at which a group of pictures in said picture database was captured, and each picture icon positioned within the environment of the second geographical metaphor at a location that corresponds to the specific location at which the group of pictures was captured; and a fourth display generator adapted to generated a fourth display level linked to said third display level, said fourth display level having a fourth geographical metaphor with greater geographical specificity than said third geographical metaphor with picture icons, each said picture icon indicating a specific location in said fourth geographical metaphor at which a group of pictures in said picture database was captured, and each picture icon positioned within the environment of the fourth geographical metaphor at a location that corresponds to the specific location at which the group of pictures was captured;

a fifth display generator adapted to generated a fifth display level linked to said fourth display level, said fifth display level having a fifth geographical metaphor with greater geographical specificity than said fourth geographical metaphor with picture icons, each said picture icon corresponding to a specific location in said fifth geographical metaphor at which a group of pictures in said picture database was captured, and an additional level generator adapted to generated an additional level comprising digital representations of the pictures corresponding to icons in said fifth display level;

wherein said second display level is generated via activating a picture icon in said main display level, said third display level is generated via activating a picture icon in said second display level, said fourth display level is generated via activating a picture icon in said third display level, said fifth display level is generated via activating a picture icon in said fourth display level.

22. The system in claim 14, wherein said first geographical metaphor is a world map.

23. The system in claim 14, wherein said first geographical metaphor is a world map, and said second geographical metaphor is a continent map.

24. The system in claim 14, wherein said first geographical metaphor is a world map, and said second geographical metaphor is a country map.

25. The system in claim 19, wherein said first geographical metaphor is a world map, said second geographical metaphor is a continent/country map, and said third geographical metaphor is a state/territory map.

26. The system in claim 20, wherein said first geographical metaphor is a world map, said second geographical metaphor is a continent/country map, said third geographical metaphor is a state/territory map, and said fourth geographical metaphor is a city/town map.

* * * * *

UNITED STATES PATENT AND TRADEMARK OFFICE
CERTIFICATE OF CORRECTION

PATENT NO. : 6,883,146 B2
DATED : April 19, 2005
INVENTOR(S) : Prasad V. Prabhu et al.

It is certified that error appears in the above-identified patent and that said Letters Patent is hereby corrected as shown below:

Column 12,
Lines 1, 13, 25 and 33, replace "to generated" with -- to generate --.

Signed and Sealed this

First Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,883,146 B2  Page 1 of 1
APPLICATION NO. : 09/742963
DATED : April 19, 2005
INVENTOR(S) : Prasad V. Prabhu et al.

It is certified that error appears in the above-identified patent and that said Letters Patent is hereby corrected as shown below:

| | |
|---|---|
| Column 5, claim 1, lines 64-65 | Please delete the words "a picture icon in said main display level" |
| Column 6, claim 6, line 55 | Please replace the word "third" with the word --second-- |
| Column 7, claim 7, line 48 | Please replace the word "third" with the word --fourth-- |

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

PATENT NO. : 6,883,146 B2  
APPLICATION NO. : 09/742963  
DATED : April 19, 2005  
INVENTOR(S) : Prasad V. Prabhu et al.

Page 1 of 2

It is certified that error appears in the above-identified patent and that said Letters Patent is hereby corrected as shown below:

| Column | Line | Description should read |
|---|---|---|
| 5 | 48 | metaphor, |
| 6 | 30 | metaphor, |
| 6 | 42 | metaphor, |
| 6 | 44 | third |
| 7 | 15 | metaphor, |
| 7 | 26 | metaphor, |
| 7 | 37 | metaphor, |
| 7 | 39 | fourth |
| 8 | 5 | metaphor, |
| 8 | 7 | second |
| 8 | 17 | metaphor, |
| 8 | 31 | metaphor, |
| 8 | 48 | geographical |
| 9 | 32 | metaphor, |
| 9 | 34 | second |
| 10 | 11 | metaphor, |
| 10 | 13 | second |
| 10 | 23 | metaphor, |
| 10 | 60 | metaphor, |
| 10 | 62 | second |
| 11 | 5 | metaphor, |
| 11 | 17 | metaphor, |
| 11 | 19 | fourth |
| 11 | 56 | metaphor, |
| 11 | 58 | second |

Signed and Sealed this

Fifth Day of October, 2010

David J. Kappos  
*Director of the United States Patent and Trademark Office*

| Column | Line | Description should read |
|--------|------|------------------------|
| 12 | 5 | metaphor, |
| 12 | 17 | metaphor, |
| 12 | 29 | metaphor, |